United States Patent [19]

Campbell

[11] Patent Number: 5,118,425

[45] Date of Patent: Jun. 2, 1992

[54] METHOD FOR REMOVING OIL OR HYDROCARBONS FROM WATER

[76] Inventor: Loren S. Campbell, 3220 W. Main St., Whistler, Ala. 36612

[21] Appl. No.: 794,717

[22] Filed: Nov. 15, 1991

[51] Int. Cl.⁵ .............................................. B01D 15/04
[52] U.S. Cl. .................................. 210/691; 210/768; 210/799; 210/924
[58] Field of Search ............... 210/923, 925, 749, 751, 210/797, 799, 768, 772, 198.1, 691, 708, 704, 693, 663, 924

[56] References Cited

U.S. PATENT DOCUMENTS

| | | | |
|---|---|---|---|
| 2,367,384 | 1/1945 | Tymstra | 210/925 |
| 3,487,928 | 1/1970 | Canevari | 210/695 |
| 3,567,660 | 3/1971 | Winkler | 210/680 |
| 3,855,152 | 12/1974 | Preus | 210/691 |
| 3,929,631 | 12/1975 | Winkler | 210/693 |
| 4,071,175 | 3/1977 | Preus | 210/691 |
| 4,170,550 | 10/1979 | Kamodi | 210/638 |
| 4,226,711 | 10/1980 | Cain | 210/691 |
| 4,836,302 | 6/1989 | Heilhecker | 210/634 |

Primary Examiner—Stanley S. Silverman
Assistant Examiner—Cynthia L. Nessler

[57] ABSTRACT

A method for removing hydrocarbon impurities, particularly oil, from water comprising the steps of applying pulverized hydrocarbon gilsonite or a slurry thereof to a body of water containing the impurities, mixing the gilsonite and hydrocarbon to form a mixture, allowing the mixture to separate from the water and coagulate and removing the solution, followed by recovering the oil using existing cracking techniques. The invention also comprises additional steps of purifying the hydrocarbon gilsonite and aerating the same before application to the water to improve the oil absorption and buoyancy qualities of the gilsonite.

17 Claims, No Drawings

METHOD FOR REMOVING OIL OR HYDROCARBONS FROM WATER

BACKGROUND OF INVENTION

1. Field of Invention

The invention relates to techniques for cleaning up hydrocarbons.

More particularly, the invention relates to a method for cleaning oil or similar spills.

More particularly, the invention relates to a method for coagulating an oil spill or hydrocarbon spill on a fluid medium such as water by applying hydrocarbon gilsonite or one of the refined by-products thereof to the oil and water.

2. Prior Art

Contamination of the seas and estuaries by crude and refined hydrocarbon oil spills, either accidental or by natural phenomena, has resulted in massive pollution of many areas. The environmental damage to marine and shoreline ecosystems is inestimable but will certainly total many billions of dollars worldwide.

While the cost of cleanup to date is billions of dollars, no completely satisfactory system has been devised and no quick response plans are in place.

There are a number of methods in the prior art for oil/water separation, including physical methods of settling and skimming, centrifugations, absorption, magnetic powders, magnetic impregnated absorbent media, burning the oil slicks, recovery and burning the oil and absorbent media, chemically caused dispersion and absorption with materials which usually sink following absorption.

The methods of the prior art have serious limitations as burning, sinking, and dispersion further pollutes the water and sea bottoms. The skimming process is capable of removing large quantities of oil at a high rate but generally require expensive settling, centrifugation or other water separation devices.

The systems basically require improvement to be effective in economical recovery of a massive spill and protect the sea fauna and shoreline ecosystems.

It would be desirable if a material could be provided that would make it possible to absorb, confine, and collect the petroleum oil on the surface of the sea and remove it by skimming or surface collection methods for recovery by an economical method.

This invention preferably utilizes a high melting point resin extracted from a natural-occurring, solid hydrocarbon named Gilsonite. The invention can utilize with essentially equal efficacy the raw mineral as well as both the low and high melting point extract.

The present invention provides a material, aerated gilsonite, that can be readily dispersed to absorb the hydrocarbon oil spill, whether crude or refined, in a body of water of any size and with subsequent recovery of the absorbent and hydrocarbon from the water body. The absorbent and the hydrocarbon oil, a mixture solution, can then be processed using existing technology in a standard oil refinery.

The absorbent can be economically recovered and processed for reuse utilizing the same technology used to remove impurities.

The complete recovery of the spilled hydrocarbon, with subsequent refining, is an integral part of the utility of the present invention. The hydrocarbon absorbed, will remain strongly absorbed for days or weeks without harmful effects on wildlife, aquatic species, animals or shoreline ecosystems.

It is therefore an object of the invention to provide a method of preparing hydrocarbon gilsonite for treating oil spills.

It is a further object of the invention to provide a method for treating hydrocarbon contaminated water so as to allow for easy removal of the contaminate using gilsonite.

It is a further object of the invention to provide a method for recovery of hydrocarbon or oil spills allowing for the recovery of the oil which would otherwise be lost.

It is a further object of the invention to provide an effective and economic method or system of containing and recovering oil spills.

Other objects and advantages of the invention will become better understood hereinafter from a consideration of the specification with reference to the accompanying drawings forming a part thereof, and in which like numerals correspond to parts throughout the several views of the invention.

Further understanding of the nature and objects of the present invention, reference should be had to the following detailed description taken in conjunction with the accompanying tables in which like parts are given like reference numerals and wherein:

Table 1 shows the preferred embodiment of the invention.

Table 2 shows an alternate embodiment of the invention shown in Table 1.

Table 3 shows a second alternate embodiment of the invention shown in Table 1.

Table 4 shows a third alternate embodiment of the invention shown in Table 1.

DETAILED DESCRIPTION OF THE PREFERRED EMBODIMENT

The organic mineral used in the present invention, gilsonite, preferentially absorbs oil in presence of water, either fresh or seawater and partially dissolves and floats on water when loaded with oil or other solvents. If it is not picked up immediately, the material will gradually harden and float to shore where vacuum recovery would be feasible.

Of particular importance, the organic mineral can be produced in large quantities at a cost significantly below the materials currently used.

The typical physical properties of the modified and straight natural mineral, gilsonite, as used in the invention are as follows:

SOLUBILITY

Soluble in various petroleum and coal-derived solvents, terpenes and chlorinated solvents.

APPEARANCE

Lump form: Black
Pulverized: Brown to Black
Odor: Low
Boiling Point: Not applicable
Melting Point: 250-500 degrees F. Ball & Ring
Bulk Density: 38 lb./Cubic ft.
Specific Gravity: 1.05
Aromatic Carbon: 31
Aliphatic Carbon: 69
H/C Atomic Ratio: 1.40+10
Flash Point: Over 212 degrees F.

Preparation of the mine run mineral requires drying and pulverizing the resin to a −30-200 mesh screen size. The invention can use coarser or finer mesh. It is desirable to have a material that can be distributed over the oil spill by blowing or mechanical spreading.

The present invention utilizes a naturally occurring mineral which may be altered to remove existing hydrocarbon impurities. The mineral is generally known as hydrocarbon gilsonite. Hydrocarbon gilsonite has a higher specific gravity than water, but is lighter than water when properly granulated. Granulated gilsonite has a tendency to remain on top of water and is insoluble therein. Gilsonite has a specific gravity of approximately 1.05. In bulk, after aeration, its specific gravity is approximately 0.6 that of water.

TABLE 1

1. Powdering or pulverizing gilsonite in the presence of air
2a. Removing resins from minegrade gilsonite
2. Adding a non-emulsifying agent
3. Applying to water/oil spill
4. Contacting the oil and gilsonite
5. Mixing the oil and gilsonite
6. Waiting for the oil and gilsonite to form a mixture
7. Removing the mixture
8. Cracking the mixture to recover the hydrocarbons As can best be seen by reference to Table 1 the method shown herein comprises the following steps.

Step 1 is powdering or pulverizing hydrocarbon gilsonite. In order to have the greatest surface area of the mineral contact the oil to be absorbed, and to have the mineral float to the surface of the water, pulverization of the gilsonite is necessary. In the preferred embodiment, this is accomplished by grinding hydrocarbon gilsonite to a mesh between 30 and 400. Air entrainment is a by-product of this process.

Large lumps of the mineral as mined are heavier than water, having a specific gravity of 1.05. As a result, the gilsonite in this form tends to sink. In order to put the gilsonite into a lighter-than-water form, aeration is accomplished, usually by pulverizing the gilsonite through a mesh screen. In this way, sufficient pockets are formed to give the gilsonite an effective specific gravity less than water. The bulk weight of the powdered gilsonite has an effective density of only 0.6 that of water.

TABLE 2

1. Powdering or pulverizing gilsonite
2. Mixing the gilsonite and solvents to form a lighter than water resin
3. Apply by spraying onto the oil spill
4. Contacting the oil and gilsonite
5. Mixing the oil and gilsonite
6. Waiting for the oil and gilsonite to form a mixture
7. Removing the mixture
8. Use of standard cracking techniques to recover the oil Of course, this aeration or density change may be accomplished in several different ways. Examples include pulverization in the presence of air, the preferred embodiment Table 1. Also, the gilsonite may be mixed with less dense materials as shown in Table 2, forming resins with lighter than water hydrocarbons. Gilsonite partially dissolves in a wide variety of paraffin-type solvents known in the art, and it is taught herein that these solvents may be mixed with the gilsonite prior to its application to form a lighter than water solution of gilsonite which may be sprayed on the spill. These solvents include hexane, heptane, octane and other known solvents of gilsonite.

Solvents could include the oil spill itself which could be pumped into the gilsonite prior to spraying it onto the remaining spill.

The mixing of the gilsonite with oil which takes place after the application of the powdered gilsonite results in a mixture of the gilsonite and oil which is a solution. This solution is lighter than the water and floats.

It should be noted that the exact amount of pulverization is largely discretionary, a certain amount occurring in the mining process. The exact extent of the pulverization can vary greatly. In the preferred embodiment, the mineral is applied above the oil slick. In this manner, the hydrocarbon gilsonite should not be finer than a 300 mesh or it would tend to be blown away by light winds. This is not necessarily the case for all conditions. For example, in one alternate embodiment, shown in Table 2, the hydrocarbon is applied beneath the oil. In this situation, the finer the mesh, the more surface area would be available for contacting the oil slick and hence a finer mesh would be desired. Additionally, the finer the mesh, the greater the chance that the gilsonite could be pumped or blown onto or under the slick to be contacted.

TABLE 3

1. Powdering or pulverizing gilsonite
2. Mixing the gilsonite and solvents to form a lighter than water resin
3. Apply by spraying onto the oil spill
4. Contacting the oil and gilsonite
5. Mixing the oil and gilsonite
6. Waiting for the oil to form a mixture
7. Removing the mixture
8. Use of standard cracking techniques to recover the oil In a third embodiment, shown in Table 3, the gilsonite is mixed (Step 2) with a non-coagulating (non-absorbing) or partially coagulating carrier in order to form a slurry prior to being blown onto the surface area. In the preferred embodiment, this carrier would be water. This slurry is a suspension of the gilsonite particles as the gilsonite does not easily become wet. Since the pulverized gilsonite is lighter than water and therefore tends to rise in water, this slurry could be formed immediately before applying the slurry to the water and could be maintained by continually mixing the slurry until it was applied. This slurry would aid the application of the hydrocarbon gilsonite to the existing water by allowing the mixture to be easily pumped. It would also allow for a finer mesh to be used in windy conditions.

Normally an emulsifying agent would not be used in conjunction with the invention. Emulsifiers would tend to block the absorbing qualities of the gilsonite. As shown in Table 1, an anti-emulsifier may be mixed (Step 2) with the gilsonite or oil spill prior to mixing in order to increase the mixing potential.

After putting the hydrocarbon gilsonite into the proper form, as set forth above, for appilcation, Step 3, the next step, is applying the pulverized hydrocarbon gilsonite to the oil spill. This would be the appilcation of the gilsonite powder or slurry over the surface of the body of water on which the oil lies or applying the gilsonite underneath the slick so that it rises into the oil spill.

Usually, unless the gilsonite is applied a distance from the oil, contact will be instantaneous. Nevertheless, some mechanism for contacting (Step 4) the hydrocarbon gilsonite and oil is the next step since only by having contact can the mixing occur allowing the mixture of oil and gilsonite to form.

Also, some mixing (Step 5) of the oil and hydrocarbon gilsonite after contacting (Step 4) is necessary. It is obvious that contacting and mixing (Step 5) are to some extent the same. In some conditions, mixing may only require that the gilsonite and oil be allowed to remain together while the natural wave action of the sea or movement of a river occurs. In other conditions, as with Table 3, the mixing is aided by the physical contact of the slurry of gilsonite and water or by the solid gilsonite contacting the liquid either by falling on the same or rising underneath it. Under other circumstances, some physical mechanism might be used to stir the mixture together. In large bodies of water, this could be done by having a boat move through the solution.

Some period of waiting (Step 6) for the mixture to evolve is necessary prior to removing the same. Although the exact time period varies, the solution formation can be nearly instantaneous. A longer period may be necessary where the mixing is not easily accomplished because a small amount of gilsonite relative to the size of the spill is used or where the oil layer is much lower in the water than the gilsonite level.

The exact mechanism disclosed herein provides that the gilsonite will at least partially dissolve in the oil or the oil dissolves in the gilsonite. The resulting dissolved mixture (gilsonite and oil) is lighter than water and floats to the surface where it forms a separate layer. This layer may vary from a solid to a liquid. With small amounts of gilsonite, the mixture is fluid. As more gilsonite is added, the mixture tends to solidify to an asphalt consistency.

After the solution is formed because of the application of the gilsonite, the next step is removing (Step 7) the resulting solution. There are several methods of removing oil or solutions from water utilizing conveyor belts or rotating drums which would also work with the instant invention. Also removing by suction of the resulting solution from the water surface is a viable method.

TABLE 4

Use with Holding Tank

1. Pulverizing gilsonite
2. Charging tank with pulverized gilsonite
3. Pumping water with oil spill to a tank on an end
4. Contacting the oil and gilsonite
5. Mixing the oil and gilsonite
6. Waiting for the oil and gilsonite to form a mixture
7. Draining water from far end of tank below gilsonite layer
8. Use of standard cracking techniques to recover the oil An alternative shown in Table 4 would allow for the gilsonite to be kept in a holding tank (Step 2) and adding (Step 3) the oil spill to this tank. In the preferred embodiment, the gilsonite would be in solution and kept in a tank. As water was added utilizing skimmers, the gilsonite would absorb the oily component. Below the surface and away from the area where the addition took place, the water could be drained off (Step 7).

Similarly, the spill could be pumped (Step 2) into a holding tank (Table 4) where it could be mixed with a gilsonite solution which was charged to the tank (Step 1) prior to the separation. The water could then be drained, (Step 7) below the gilsonite and oil mixture after contacting, Step 4, mixing (Step 5) and waiting for separation (Step 6). This would preferably be a distance from the influent area so as to avoid turbulent mixture before draining.

Mine grade hydrocarbon gilsonite has several valuable hexane or paraffin solvent or otherwise soluble constituents which are unnecessary for performance for oil coagulation. Aside from these resins' inherent value in industry, the removal of these under certain circumstances improves the oil absorption characteristics of the gilsonite, thus improving its absorption ability. Hence, an additional step (Step 2(a)) available is the removal of these valuable by-products which are generally hydrocarbon resins leaving the asphaltenes which are refined gilsonite. This may be accomplished using Hexane, Heptane or similar solvents to leach the resins from the gilsonite.

The following examples represent preferred embodiments of the invention as to mixing ratios under laboratory conditions:

EXAMPLE I

Charge a galvanized tub measuring about 60 cm in diameter with seawater to a five (5) centimeter depth and then charge this with one thousand grams of a 20 API (American Petroleum Institute) gravity crude oil. The mixture is agitated to assure maximum dispersion of oil on water and then one thousand grams of $-50$ to $-200$ mesh pulverized mineral gilsonite is sifted over the oily surface. The tub contents are then agitated for ten (10) minutes to give contact and simulate wave action. The time is not critical.

The absorbent powders and absorbed oil floated on the surface and was easily removed with a wide spatula. The water had no oil sheen.

The surface contacting the oil had some immediate tack that in one half hour was substantially zero and no oil was visible or removable when part of the cake was removed by hand.

EXAMPLE II

Charge a galvanized tub that is twelve inches in diameter and ten inches deep with one gallon of seawater, 200 grams of 20 API gravity crude oil, and 200 grams of pulverized $-20 +300$ mesh DER 200 resin, a commercially available by-product of gilsonite extraction, with specifications as follows:

| Melting Point, Ball & Ring Degrees C. | 200 |
| --- | --- |
| Aromatic Carbon | 32 |
| Aliphatic Carbon | 68 |
| Hydrogen to Carbon ratio | 1.38 |

The constituents were mixed with paddle stirrer to simulate wave action and then skimmed off with a belt skimming device. The water is free of oil and the powdered absorbent contains the 200 g of crude oil.

EXAMPLE III

Charge a galvanized tub that is twelve inches in diameter and ten inches deep with 200 grams of Light Overhead Distillate containing 60% aromatic constituents with:

| Initial Boiling Point | 140 Degrees C. |
| --- | --- |
| 50% | 120 Degrees C. |
| End Point | 200 Degrees C. |

The absorbent powder as used in Example I was applied to the surface of the LOH distillate. The highly aromatic distillate was rapidly absorbed by the mineral and was removed by skimming.

EXAMPLE IV

Charge a galvanized tub measuring sixty (60) cm with three (3) gallons fresh water, 200 grams of light aromatic distillate with a boiling range of 140 degrees C. to 200 degrees C. containing 60% aromatic solvents and then add incrementally in 50 gram lots the pulverized mineral Gilsonite as previously used. Wave action is created until the distillate is totally absorbed or until additional pulverized absorbent powder is required to absorb the distillate.

It was found that 200 grams of powder was necessary to completely contain all distillate in a tacky mass.

The immediate results were a skimmable mass with clear non-sheen water. After two weeks the solid obtained was a hard, non-tacky solid that left no oil sheen or oil print when handled.

EXAMPLE V

In order to determine if an emulsifier would improve that performance of the natural mineral, several emulsifying agents were used in conjunction with the absorbent.

| Emulsifying Agent | Absorbent | Contaminant |
| --- | --- | --- |
| Na$_2$CO$_3$ | Pulverized Gilsonite | Crude Oil |
| Detergent Solution | Pulverized Gilsonite | Crude Oil |

The emulsifying agent in each case had a detrimental effect on the quantity absorbed. The emulsifying agent caused water wetting of the gilsonite powder and limited the oil absorption.

In all cases, approximately double the normal one to one (1:1) ratio had to be employed to effectively remove the oil.

EXAMPLE VI

Example V was repeated using light distillate with 20% charge of emulsifier based on weight of the distillate. The results were unsatisfactory and no emulsifier is definitely preferred.

EXAMPLE VII

A concrete chamber measuring 321 square feet is charged with 1.67 cubic feet of 20 API gravity crude oil and stirred with a wave-forming motion. The oil was spread uniformly over the concrete enclosure.

By means of a fluidizing blower, 100 lb. pulverized Gilsonite was spread over the oil surface. A wave motion was continuously produced with a paddle wheel device. The wave motion was continued for fifteen minutes before starting the skimming procedure.

The skimmer, constructed as a continuous belt, conveyed the absorbent powder and absorbed the oil into a 16 square foot container.

The conveyor was washed with high pressure water at a rate of 32 lb. per 200 lb. of absorbent and oil skimming. The wash water separated and was drained into the concrete chamber.

EXAMPLE VIII

The absorbent and absorbed oil from Example VII was placed in the concrete pool and vigorously agitated. The cake-like absorbent containing the absorbed oil was broken and separated into many smaller agglomerated distinctly separate particles. These particles contained absorbent plus absorbed oil.

The particles float and do not disgorge the absorbed oil and appear non-oily to the touch.

To the agitated mass, 20 lb. of mixed aggregate consisting of natural pea gravel, one inch and larger river rock, and concrete rip-rap was added. The agitation was stopped and there was no visible evidence of oil contamination of the stone surface.

After separation of the mixture of gilsonite and oil, standard cracking techniques may be used to recover the hydrocarbon constituents. Gilsonite itself may be economically cracked. Additionally, solvent extraction may be used.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A method of removing oil from water comprising the steps of:
    a. Determining the specific gravity of the water;
    b. Pulverizing hydrocarbon gilsonite to a mesh sufficiently fine so that the resulting powder has a specific gravity less than the water;
    c. Applying the gilsonite to the oil in the water;
    d. Waiting for the gilsonite and oil to form a mixture;
    e. Removing the resulting mixture.

2. The method of claim 1 further comprising the step of combining the pulverized hydrocarbon gilsonite with a lighter than water substance so that the resulting combination is lighter than the water in which the oil is located.

3. The method of claim 2 wherein the step of pulverizing hydrocarbon gilsonite is done in the presence of a lighter than water gas so that the hydrocarbon gilsonite is combined with the lighter than water gas.

4. The method of claim 3 wherein the lighter than water gas is air.

5. The method of claim 1 wherein the pulverizing further comprises the step of grinding the hydrocarbon gilsonite to a mesh between 30 and 400.

6. The method of claim 1 further comprising the step of physically mixing the oil and hydrocarbon gilsonite after step d.

7. The method of claim 1 wherein the gilsonite is combined with a solvent capable of solubilizing gilsonite prior to applying the gilsonite to the oil so that the resulting combination is lighter than water.

8. The method of claim 1 wherein the gilsonite further comprises volatiles, resins and asphaltenes and further comprises the step of removing at least some of the volatiles and resins and asphaltenes from the hydrocarbon gilsonite prior to applying the gilsonite to the oil.

9. The method of claim 8 wherein the removal is done using a solvent capable of leaching volatiles and resins from the gilsonite.

10. The method of claim 9 wherein the solvents are from the solvents group consisting of paraffin solvents, terpene solvents, and chlorinated solvents.

11. The method of claim 1 wherein the step of applying the gilsonite further comprises the step of applying the gilsonite over the water above the oil.

12. The method of claim 1 wherein the step of applying the pulverized gilsonite comprises the step of applying the gilsonite under the water below the oil.

13. The method of claim 1 further comprising the step of recovering the oil from the mixture.

14. A method of removing oil from water comprising the steps of:
  a. Determining the specific gravity of the water;
  b. Pulverizing hydrocarbon gilsonite to a mesh sufficiently fine so that the resulting powder has a specific gravity less than the water;
  c. Applying the pulverized hydrocarbon gilsonite to the surface of the body of water on which the oil lies so that it can contact the oil;
  d. Contacting the hydrocarbon gilsonite and oil;
  e. Waiting for the contacted gilsonite and oil to mix;
  f. Removing the resulting mixture.

15. The method of claim 14 further comprising the step of physically mixing the oil and hydrocarbon gilsonite after the contacting step.

16. A method of removing hydrocarbons from water in a tank comprising the steps of:
  a. Charging a tank with gilsonite;
  b. Adding the water to said tank;
  c. Waiting for the oil and gilsonite to form a layer;
  d. Draining said water from the tank from below the level of the oil and gilsonite layer.

17. The method of claim 16 wherein the water is drained from beneath the oil and gilsonite layer a distance from the end of the tank receiving the water and oil so that the oil and gilsonite layer has an opportunity to separate from the water prior to draining.

* * * * *